(12) United States Patent
Ho (10) Patent No.: US 9,069,522 B2
(45) Date of Patent: Jun. 30, 2015

(54) FIXING MECHANISM AND RELATED ELECTRONIC DEVICE

(71) Applicant: Wistron Corporation, New Taipei (TW)

(72) Inventor: Fong-Chi Ho, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 287 days.

(21) Appl. No.: 13/851,108

(22) Filed: Mar. 27, 2013

(65) Prior Publication Data

US 2014/0198434 A1 Jul. 17, 2014

(30) Foreign Application Priority Data

Jan. 15, 2013 (TW) .............................. 102200887 U (51) Int. Cl.
- *G06F 1/16* (2006.01)
- *F16B 21/00* (2006.01)
- *G06F 1/18* (2006.01)

(52) U.S. Cl.
CPC ............... *G06F 1/16* (2013.01); *Y10T 403/591* (2015.01); *G06F 1/184* (2013.01); *G06F 1/187* (2013.01)

(58) Field of Classification Search
CPC ...... G02B 7/04; G02B 7/10; B81B 2201/014; B81B 2203/0118; B81B 3/0072; G06F 1/1679; F16M 11/041; F16M 11/105; F16M 11/2064; F16M 13/00; F16M 13/02; F16M 13/022; F16M 2200/02; F12V 15/01; F16D 1/06; F16D 2001/03; A46B 5/0041; A46B 5/0045; B29C 2045/688; B29C 33/3842; B29C 45/14614; B29C 45/6728; B29C 45/68; B29C 47/92; B29C 65/78; B29C 65/7847; B29C 66/52441; B60C 27/0223; B60H 1/00521; B60H 1/00857; B60H 1/3421; B60H 2001/3471; E05B 73/00; F01D 5/282; F16B 19/109; F16B 21/125; F16B 21/16; F16B 39/282

USPC ......... 29/525.01, 832; 403/327, 322.1, 322.4, 403/349; 248/200, 74.1, 316.5, 534, 676; 361/726, 733, 679.32

See application file for complete search history.

(56) References Cited

U.S. PATENT DOCUMENTS

| | | | | |
|---|---|---|---|---|
| 5,481,431 A | * | 1/1996 | Siahpolo et al. | 361/679.31 |
| 5,793,614 A | * | 8/1998 | Tollbom | 361/732 |
| 6,643,139 B2 | * | 11/2003 | Tien | 361/727 |
| 7,301,778 B1 | * | 11/2007 | Fang | 361/759 |
| 2007/0279858 A1 | * | 12/2007 | Grady et al. | 361/683 |
| 2007/0279884 A1 | * | 12/2007 | Hardt et al. | 361/796 |
| 2011/0141685 A1 | * | 6/2011 | Hung et al. | 361/679.43 |
| 2014/0002982 A1 | * | 1/2014 | Zheng | 361/679.32 |

* cited by examiner

*Primary Examiner* — Hung S Bui
*Assistant Examiner* — Michael Matey
(74) *Attorney, Agent, or Firm* — Winston Hsu; Scott Margo (57) ABSTRACT

A fixing mechanism includes a first positioning component, a bridging component, a movable component, a base, a second positioning component, a latch and a driving component. The first positioning component and the bridging component are disposed on a backboard, and the movable component is slidably disposed on the bridging component. The second positioning component and the latch are disposed on the base. The latch includes a guiding pin slidably disposed on the movable component. The driving component is rotatably disposed on the latch. The driving component includes an actuating portion slidably disposed on the movable component. The actuating portion slides relative to a first slot on the movable component, so that the guiding pin slides at a second slot on the movable component and the base moves close to the backboard, so as to combine a first connector disposed on the base with a second connector disposed on the backboard.

18 Claims, 8 Drawing Sheets

FIXING MECHANISM AND RELATED ELECTRONIC DEVICE

BACKGROUND OF THE INVENTION

1. Field of the Invention

The present invention relates to a fixing mechanism and a related electronic device, and more particularly, to a fixing mechanism with convenient operating function and assembly fool-proofing function and a related electronic device.

2. Description of the Prior Art

Conventional server equipment includes a plurality of electronic components. The electronic components have matched connectors to easily establish signal transmission between the separated electronic components. The connectors are manually assembled with or disassembled from each other for quick fabrication. However, the conventional server equipment utilizes the difficultly detachable connectors to electrically connect the electronic components to each other. The manual operating process for assembly and disassembly of the difficultly detachable connectors consumes physical strength of the operators and results in fabricated mistake due to tired. Therefore, design of an auxiliary fixing mechanism capable of rapidly and simultaneously combining the plurality of difficultly detachable connectors in an effort-saving manner is an important issue in the mechanical design industry.

SUMMARY OF THE INVENTION

The present invention provides a fixing mechanism with convenient operating function and assembly fool-proofing function and a related electronic device for solving above drawbacks.

According to one embodiment of the invention, a fixing mechanism for combining a first connector with a second connector is disclosed. The second connector is disposed on a backboard. The fixing mechanism includes a first positioning component, a bridging component, a movable component, a base, a second positioning component, a latch and a driving component. The first positioning component is disposed on the backboard. The bridging component is disposed on the backboard. The movable component is slidably disposed on the bridging component. The movable component includes a first slide slot and a second slide slot. A structural direction of the first slide slot is different from a moving direction of the movable component relative to the bridging component, and a structural direction of the second slide slot is between the moving direction and the structural direction of the first slide slot. The first connector is disposed on the base. The second positioning component is disposed on the base for combining with the first positioning component. The latch is disposed on the base. The latch includes a guiding pin slidably disposed on the second slide slot. The driving component is rotatably disposed on the latch. The driving component includes an actuating portion slidably disposed on the first slide slot. The actuating portion moves inside the first slide slot to slide the movable component relative to the bridging component, so that the guiding pin slides along the second slide slot and the base moves close to the backboard, so as to combine the first connector with the second connector.

According to another embodiment of the invention, an electronic device includes a backboard, a first connector, a second connector and a fixing mechanism. The second connector is disposed on the back board and detachably combined with the first connector. The fixing mechanism is for combining the first connector with the second connector. The fixing mechanism includes a first positioning component, a bridging component, a movable component, a base, a second positioning component, a latch and a driving component. The first positioning component is disposed on the backboard. The bridging component is disposed on the backboard. The movable component is slidably disposed on the bridging component. The movable component includes a first slide slot and a second slide slot. A structural direction of the first slide slot is different from a moving direction of the movable component relative to the bridging component, and a structural direction of the second slide slot is between the moving direction and the structural direction of the first slide slot. The first connector is disposed on the base. The second positioning component is disposed on the base for combining with the first positioning component. The latch is disposed on the base. The latch includes a guiding pin slidably disposed on the second slide slot. The driving component is rotatably disposed on the latch. The driving component includes an actuating portion slidably disposed on the first slide slot. The actuating portion moves inside the first slide slot to slide the movable component relative to the bridging component, so that the guiding pin slides along the second slide slot and the base moves close to the backboard, so as to combine the first connector with the second connector.

The fixing mechanism and the related electronic device of the present invention can combine the first connector with the second connector rapidly and accurately in the effort-saving manner. The present invention has advantages of simple structure, small volume and easy operation. The plurality of fixing mechanisms can be set inside the electronic device according to user's demand for simultaneously rapid combination of the plurality of matched connectors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
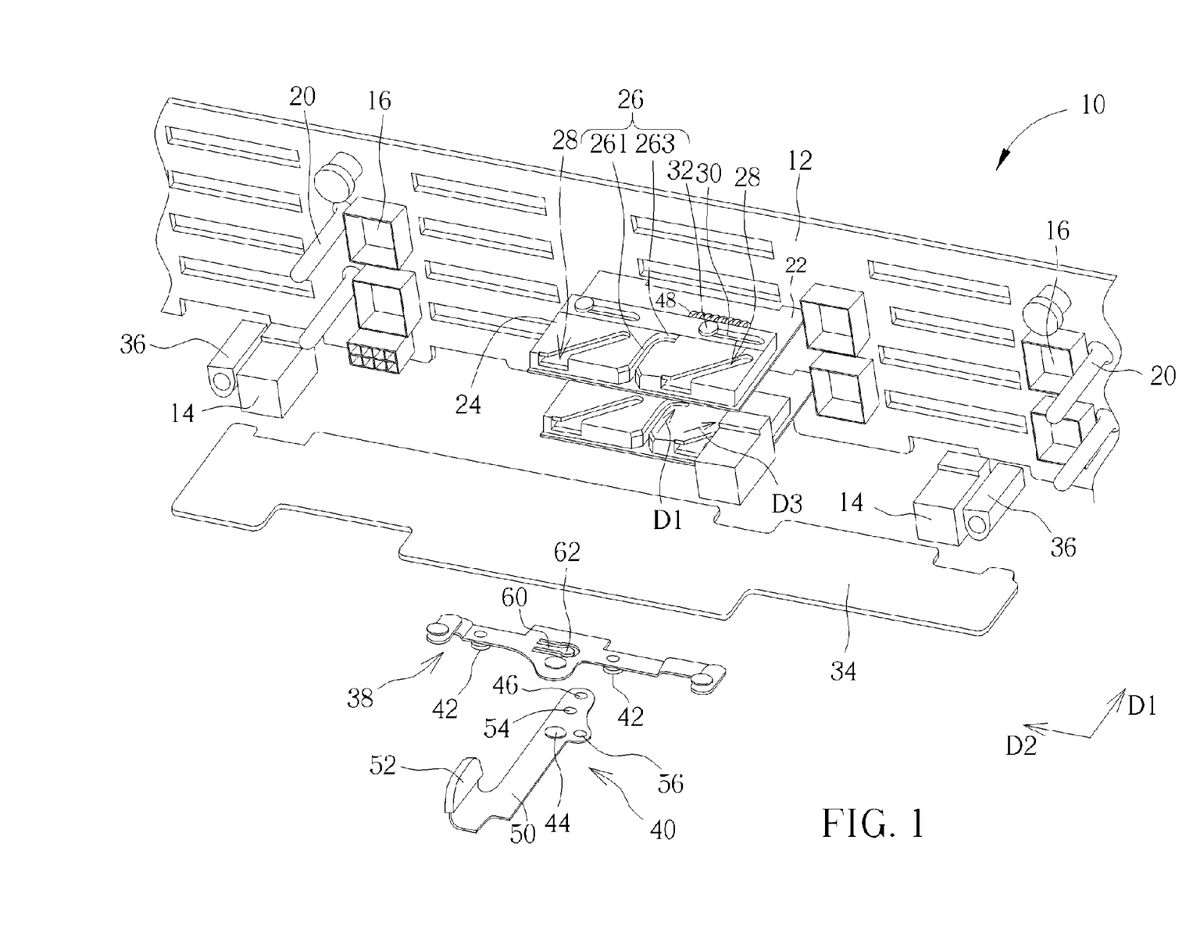
FIG. 1 is an exploded diagram of an electronic device according to an embodiment of the present invention.
Figure 2:
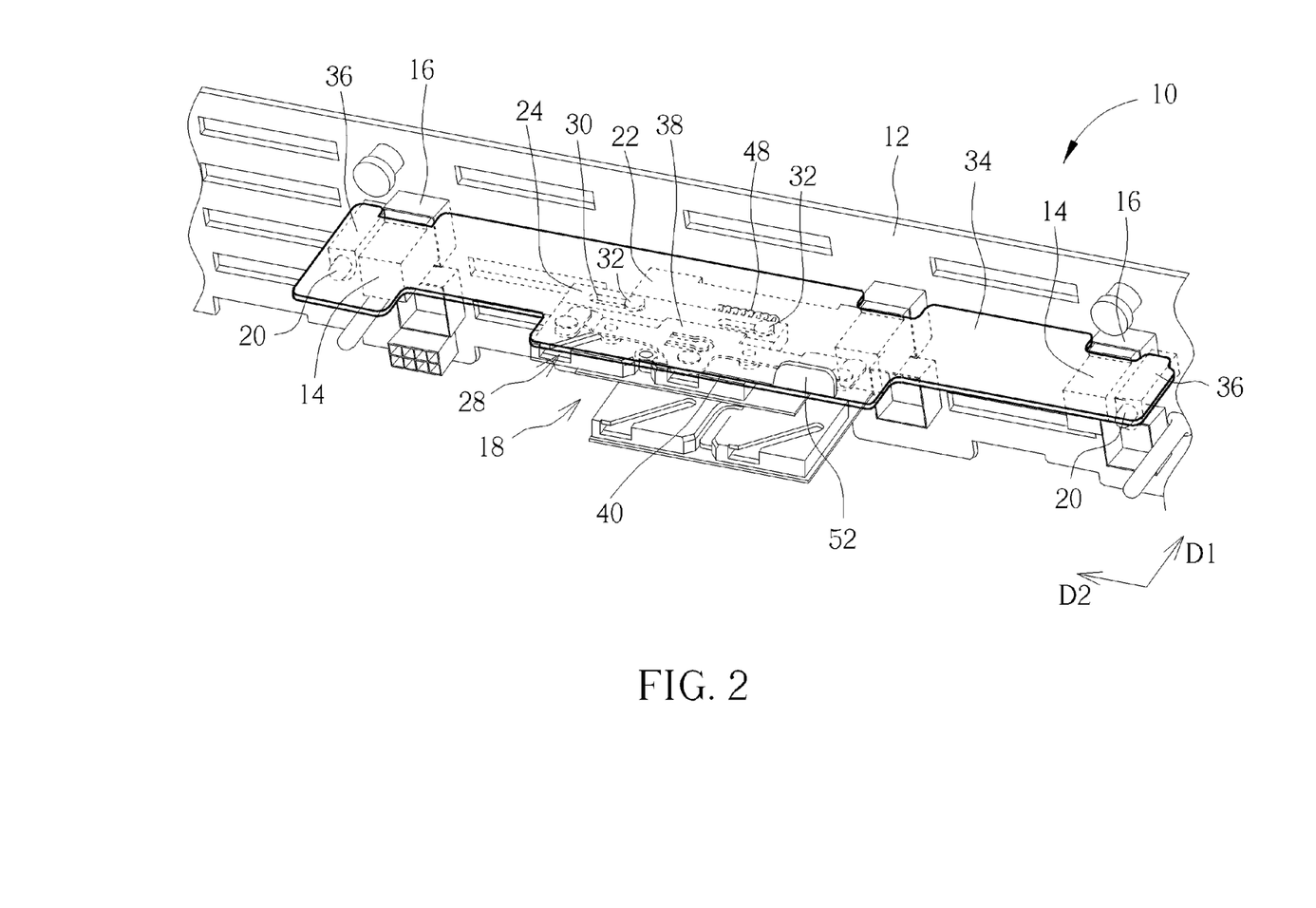
FIG. 2 is an assembly diagram of the electronic device according to the embodiment of the present invention.

Please refer to FIG. 1 and FIG. 2. FIG. 1 is an exploded diagram of an electronic device 10 according to an embodiment of the present invention. FIG. 2 is an assembly diagram of the electronic device 10 according to the embodiment of the present invention. The electronic device 10 can be a server device. A motherboard and a plurality of hard disk drives are disposed inside a casing of the server device. The hard disk drive can be electrically connected to the motherboard detachably, so that the motherboard and the hard disk drive respectively have matched connectors for combination. The electronic device 10 includes a backboard 12, a plurality of first connectors 14, a plurality of second connectors 16 and at least one fixing mechanism 18. The first connector 14 and the second connector 16 are respectively disposed on the fixing mechanism 18 and the backboard 12. The fixing mechanism 18 can move relative to the backboard 12 to combine the first connector 14 with the second connector 16 or to separate the first connector 14 from the second connector 16. An amount of the first connector 14 corresponds to an amount of the second connector 16.

The fixing mechanism includes at least one first positioning component 20, a bridging component 22 and a movable component 24. The first positioning component 20 and the bridging component 22 are disposed on the backboard 12, and the movable component 24 is slidably disposed on the bridging component 22. The movable component 24 includes a first slide slot 26, a plurality of second slide slots 28 and at least one guiding slot 30. The bridging component 22 can include a boss 32 slidably disposed on the guiding slot 30, so that the movable component 24 can move relative to the bridging component 22 via a combination of the guiding slot 30 and the boss 32. A structural direction D1 of the first slide slot 26 is different from a moving direction D2 of the movable component 24 relative to the bridging component 22. For example, the structural direction D1 can be substantially perpendicular to the moving direction D2.

The first slide slot 26 can include a first area 261 and a second area 263. The first area 261 can be a linear structure, and the second area 263 can be an arc structure. The second area 263 is connected to an end of the first area 261 in a relatively bending manner. In addition, the present invention includes two second slide slots 28 respectively located by two opposite sides of the first slide slot 26, and a structural direction D3 of the second slides slot 28 is between the structural direction D1 and the moving direction D2. For example, an angle of the structural direction D3 relative to the structural direction D1 (or the moving direction D2) can be within a range from 30 degrees to 60 degrees.

The fixing mechanism 18 further includes a base 34, at least one second positioning component 36, a latch 38 and a driving component 40. The first connector 14 is disposed on the base 34. The second positioning component 36 is disposed on the base 34, and an amount of the second positioning component 36 corresponds to an amount of the first positioning component 20. The first positioning component 20 and the second positioning component 36 can respectively be a bar and a sleeve, and the bar is slidably sheathed with the sleeve to constrain movement of the base 34 relative to the backboard 12 and to guide an assembly of the first connector 14 and the second connector 16. The latch 38 is fixed on the base 34. The latch 38 includes a plurality of guiding pins 42. Each guiding pin 42 is slidably disposed inside the corresponding second slide slot 28, which means an amount of the guiding pin 42 corresponds to the amount of the second slide slot 28.

The driving component 40 is rotatably disposed on the latch 38 via a pivot portion 44. The driving component 40 includes an actuating portion 46 slidably disposed inside the first slide slot 26. When the driving component 40 rotates relative to the latch 38, the actuating portion 46 can slide along the first slide slot 26 to move the movable component 24 relative to the bridging component 22 at the moving direction D2. Meanwhile, the guiding pin 42 can move from an outer of the second slide slot 28 into an inner of the second slide slot 28 with the movement of the movable component 24, so as to move the base 34 relative to the backboard 12 for combining the first connector 14 with the second connector 16, or further for separating the first connector 14 from the second connector 16 by reverse procedure.

The fixing mechanism 18 can further include a resilient component 48. Two ends of the resilient component 48 are respectively disposed on the bridging component 22 and the movable component 24. The fixing mechanism 18 has foolproofing function due to design of the resilient component 48. For example, the resilient component 48 utilizes the resilient recovering force to steady the movable component 24 at an initial position when the fixing mechanism 18 is at an initial state. As the second positioning component 36 is disposed on the first positioning component 20, the actuating portion 46 of the driving component 40 can align with the first slide slot 26 on the movable component 24, and each guiding pin 42 of the latch 38 can align with the corresponding second slide slot 28 on the movable component 24. The fixing mechanism 18 has automatic adjusting function for rapid and correct assembly of the first connector 14 and the second connector 16.

The driving component 40 can further include a body 50, a handle 52, a first positioning hole 54 and a second positioning hole 56. The pivot portion 44 can be disposed on the middle of the body 50. The handle 52 and the actuating portion 46 are respectively disposed on two ends of the body 50. A distance between the handle 52 and the pivot portion 44 can be substantially greater than a distance between the actuating portion 46 and the pivot portion 44, so that the driving component 40 can be operated easily to actuate assembly and disassembly functions of the fixing mechanism 18. The first positioning hole 54 and the second positioning hole 56 are respectively formed on protruding parts of the body 50 and surround around the pivot portion 44.

Accordingly, the latch 38 can further include a hole structure 58, a resilient arm 60 and a positioning block 62. An end of the resilient arm 60 is connected to a lateral wall of the hole structure 58, and the resilient arm 60 can be disposed inside the hole structure 58 in a deformable bending manner. The positioning block 62 is disposed on the other end of the resilient arm 60. Because a distance between the first positioning hole 54 and the pivot portion 44 is substantially equal to a distance between the second positioning hole 56 and the pivot portion 44, the positioning block 62 can be engaged with the first positioning hole 54 and the second positioning hole 56 when the driving component 40 rotates relative to the latch 38 at predetermined angles respectively, so as to constrain rotation of the driving component 40 relative to the latch 38. For example, the positioning block 62 is engaged with the first positioning hole 54 and the second positioning hole 56 when the driving component 40 rotates relative to the latch 38 at 0 degree and 90 degrees, to generate frictional stagnation as switching the driving component 40 for control feel.

Figure 3:
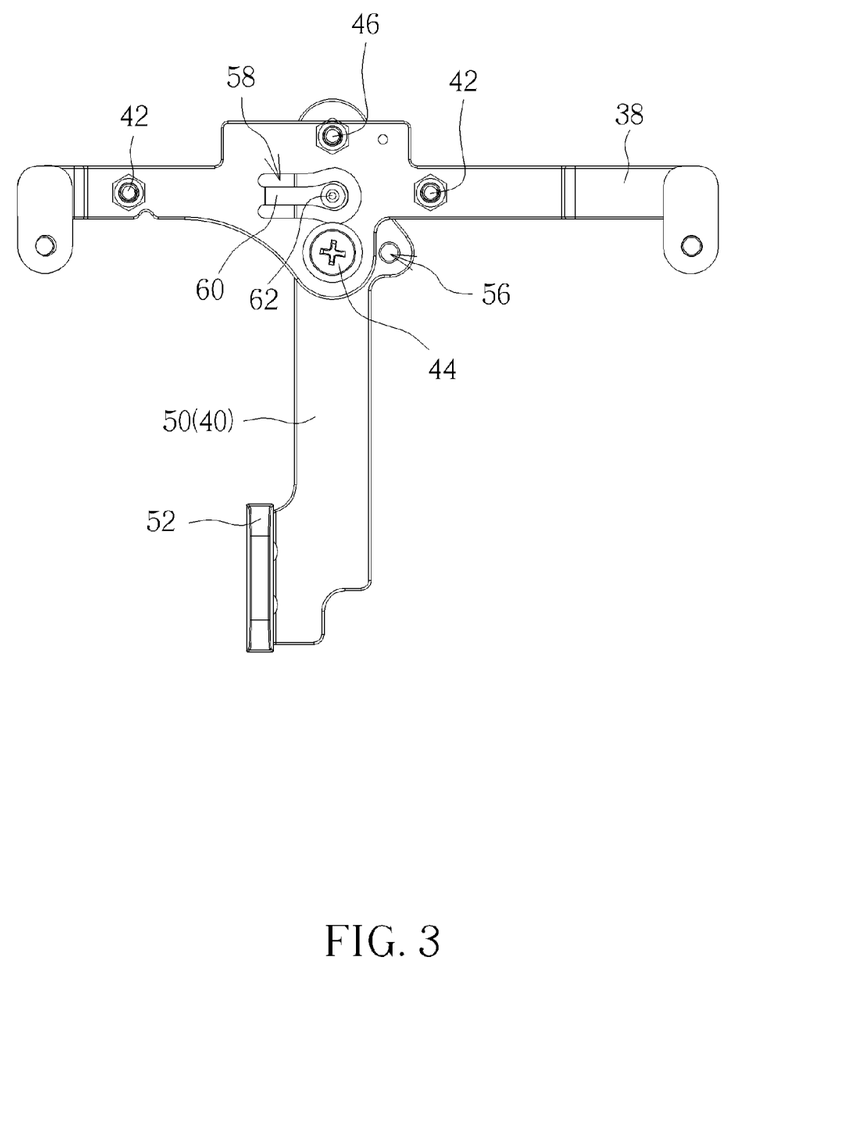
FIG. 3 and FIG. 4 respectively are diagrams of a latch and a driving component in different operation modes according to the embodiment of the present invention.
Figure 4:
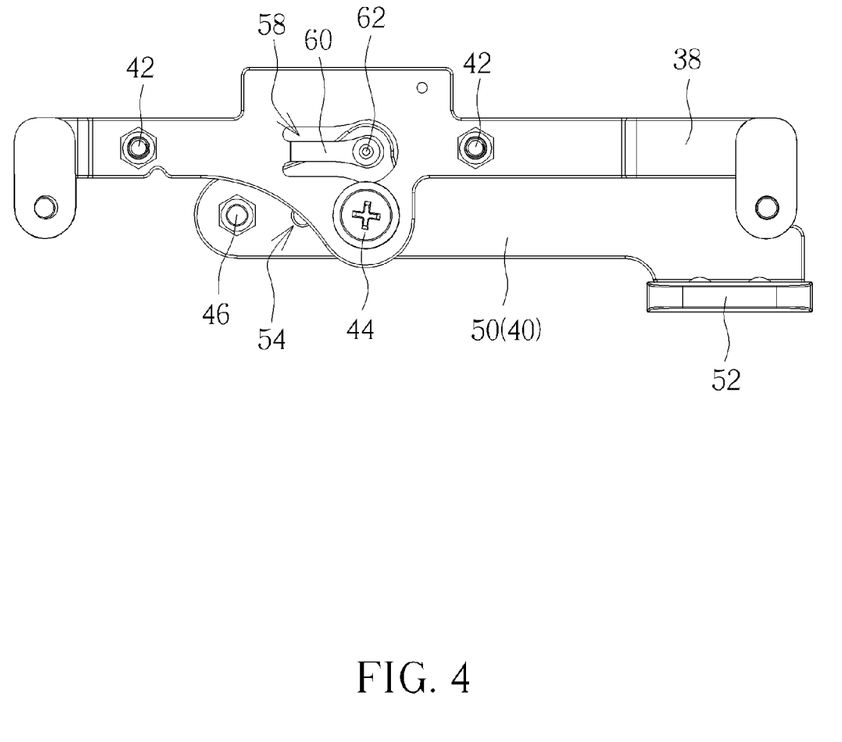

Please refer to FIG. 3 and FIG. 4. FIG. 3 and FIG. 4 respectively are diagrams of the latch 38 and the driving component 40 in different operation modes according to the embodiment of the present invention. As shown in FIG. 3, the angle between the body 50 of the driving component 40 and a main portion of the latch 38 is equal to 90 degrees, and the positioning block 62 is engaged with the first positioning hole 54 (shaded by the positioning block 62 and not shown in figures). When combining the first connector 14 with the second connector 16, a position of the guiding pin 42 relative to the latch 38 substantially corresponds to an outer (an inlet) of the second slide slot 28 on the movable component 24. Due to constraint function generated by assembly of the positioning block 62 and the first positioning hole 54, the actuating portion 46 can align with an outer (an inlet) of the first slide slot 26 on the movable component 24, so as to increase assembly accuracy and operation convenience of the fixing mechanism 18 of the present invention.

The actuating portion 46 and the guiding pin 42 respectively slide into the first slide slot 26 and the second slide slot 28, and the driving component 40 can rotate to a position that the body 50 is substantially parallel to the main portion of the latch 38, which means the angle between the driving component 40 and the latch 38 is equal to 0 degree. Then, the actuating portion 46 and the guiding pin 42 can move into bottom of the first slide slot 26 and the second slide slot 28, so the first connector 14 can be combined with the second connector 16. As shown in FIG. 4, the positioning block 62 is engaged with the second positioning hole 56 (shaded by the positioning block 62 and not shown in figure). A combination of the positioning block 62 and the second positioning hole 56 can effectively constrain the rotation of the driving component 40 relative to the latch 38, so as to prevent the fixing mechanism 18 from being released to separate the first connector 14 from the second connector 16 due to accidental hit of the driving component 40. It should be mentioned that the distance between the handle 52 and the pivot portion 44 can be substantially greater than the distance between the actuating portion 46 and the pivot portion 44, so that the driving component 40 can rotate relative to the latch 38 via the handle 52 in the effort-saving manner.

Figure 5:
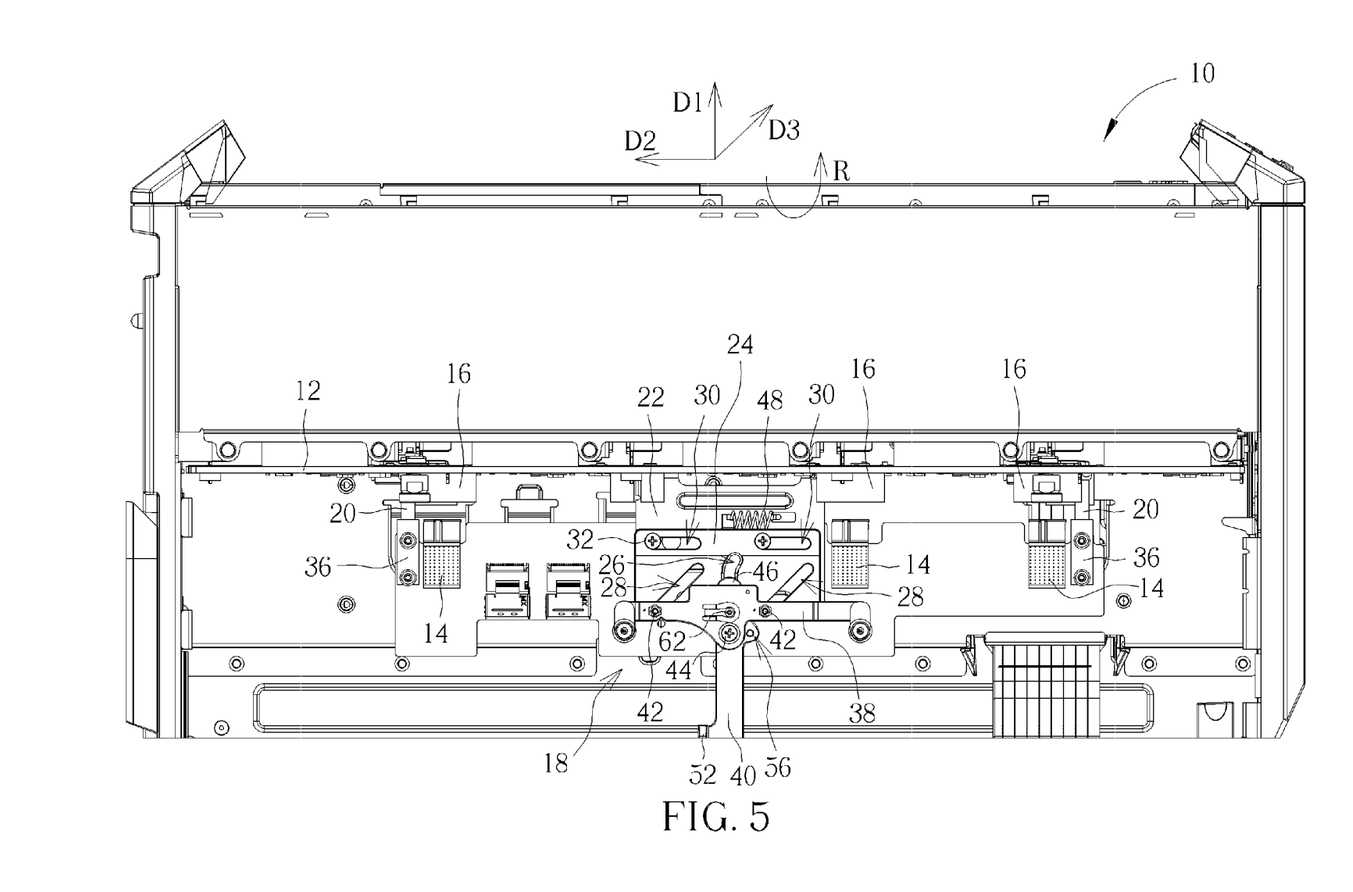
FIG. 5 to FIG. 8 respectively are diagrams of a fixing mechanism in different operation modes according to the embodiment of the present invention.
Figure 6:
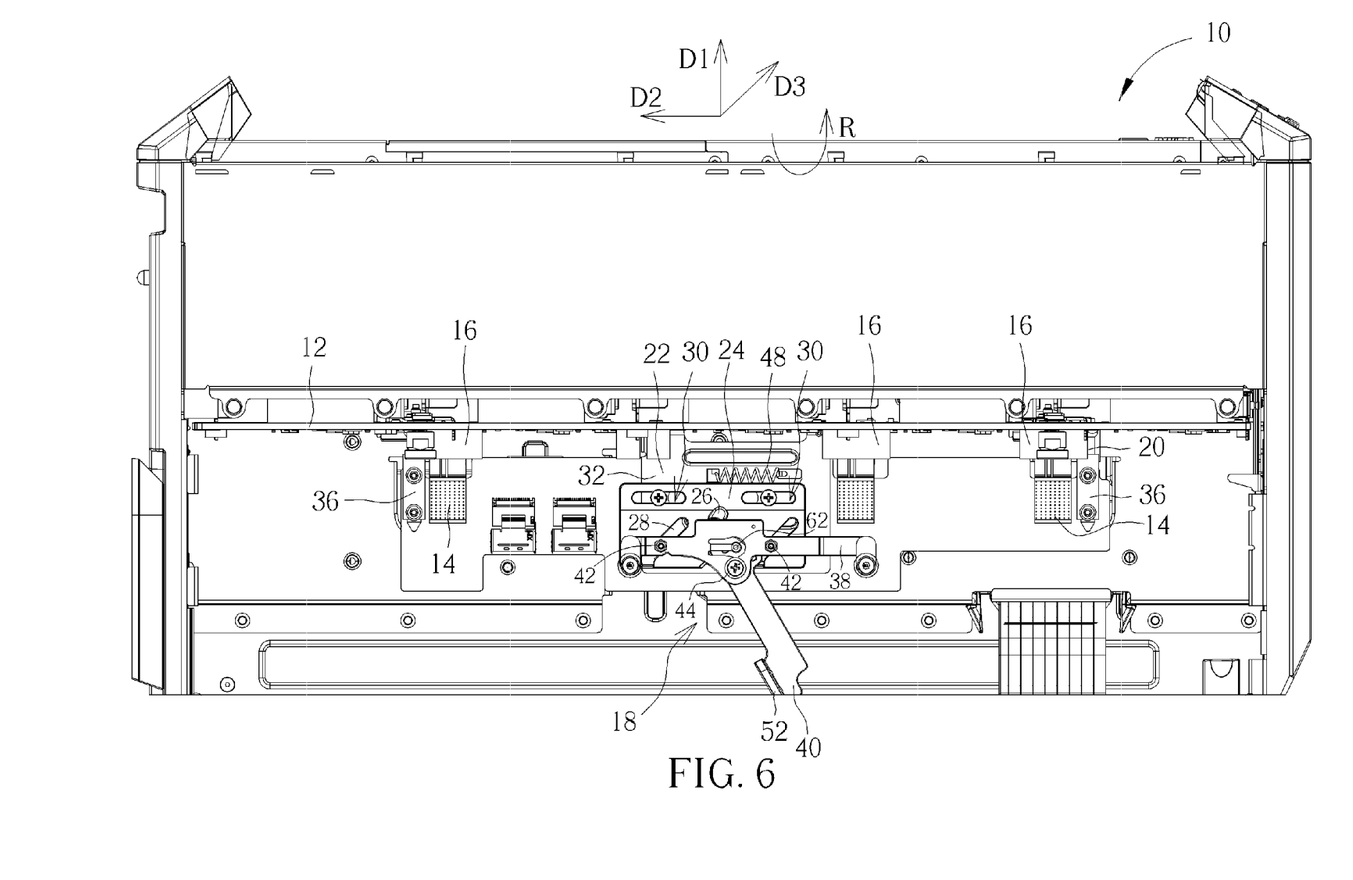

Please refer to FIG. 5 to FIG. 8. FIG. 5 to FIG. 8 respectively are diagrams of the fixing mechanism 18 in different operation modes according to the embodiment of the present invention. As shown in FIG. 5, the fixing mechanism 18 is actuated. The base 34 moves toward the plate 12, and the actuating portion 46 and the guiding pin 42 respectively align with the first slide slot 26 and the second slide slot 28 on the movable component 24. Because the actuating portion 46 is disposed on the driving component 40, a position of the actuating portion 46 towers over a position of the guiding pin 42; in the meantime, the guiding pin 42 is located outside of the second slide slot 28, and the actuating portion 46 has inserted into the first slide slot 26. As shown in FIG. 6, each guiding pin 42 moves into the corresponding second slide slot 28, the driving component 40 rotates at the counterclockwise direction R via the handle 52, and the angle between the driving component 40 and the latch 38 is smaller than 90 degrees. The actuating portion 46 and the guiding pin 42 gradually move into the first slide slot 26 and the second slide slot 28 deeply. Because the structural direction of the second slide slot 28 is between the structural direction D1 and the moving direction D2 (such as 45 degrees, and is not limited to the above-mentioned embodiments), the guiding pin 42 can push the movable component 24 to move relative to the bridging component 22 at the direction D2 when sliding into the second slide slot 28. Thus, the combination of the guiding slot 30 and the boss 32 can ensure that the moving direction of the movable component 24 is not shifted over the direction D2. The base 34 moves close to the backboard 12, and a front end of the first connector 14 inserts into the second connector 16.

Figure 7:
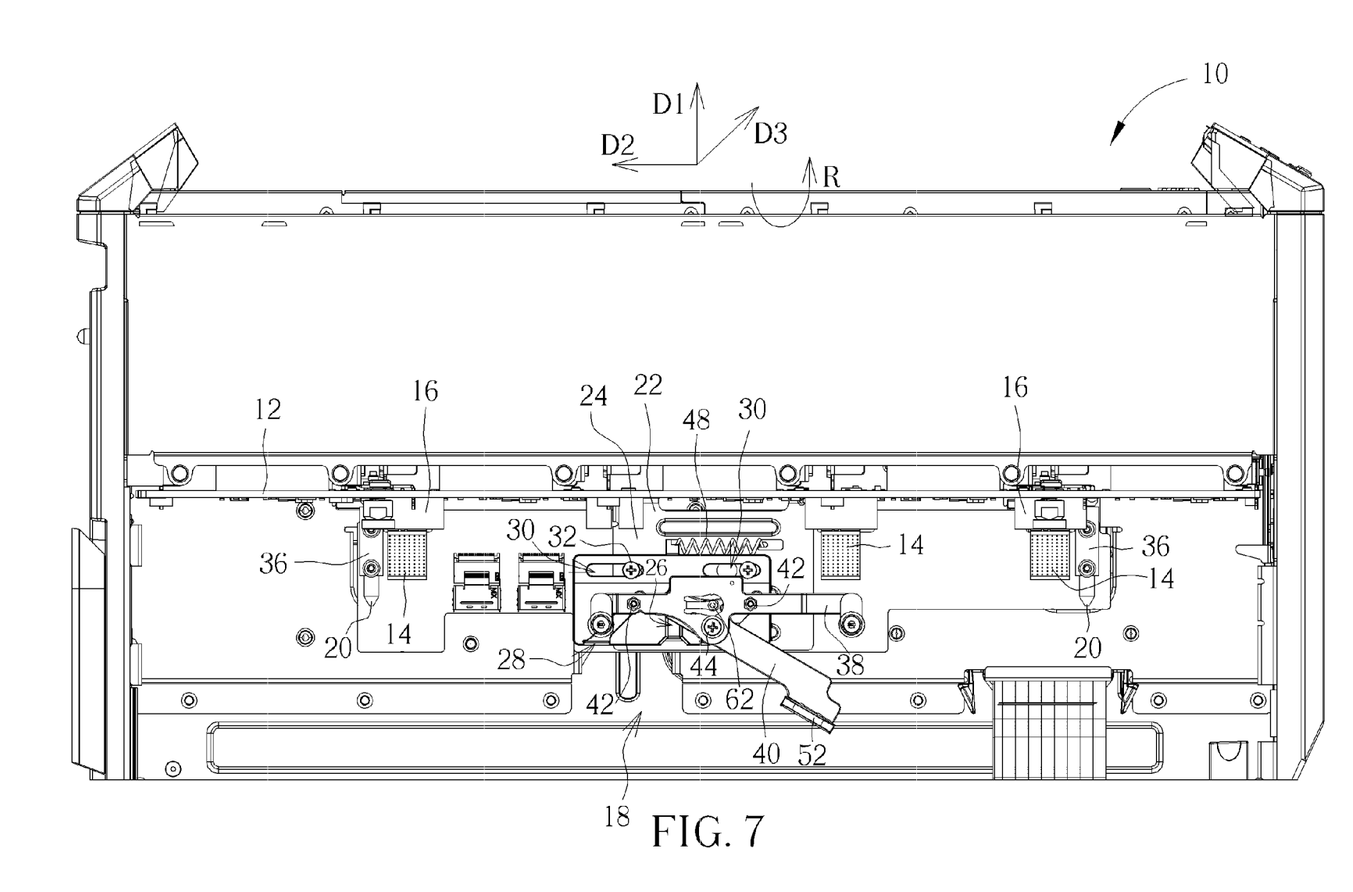
Figure 8:
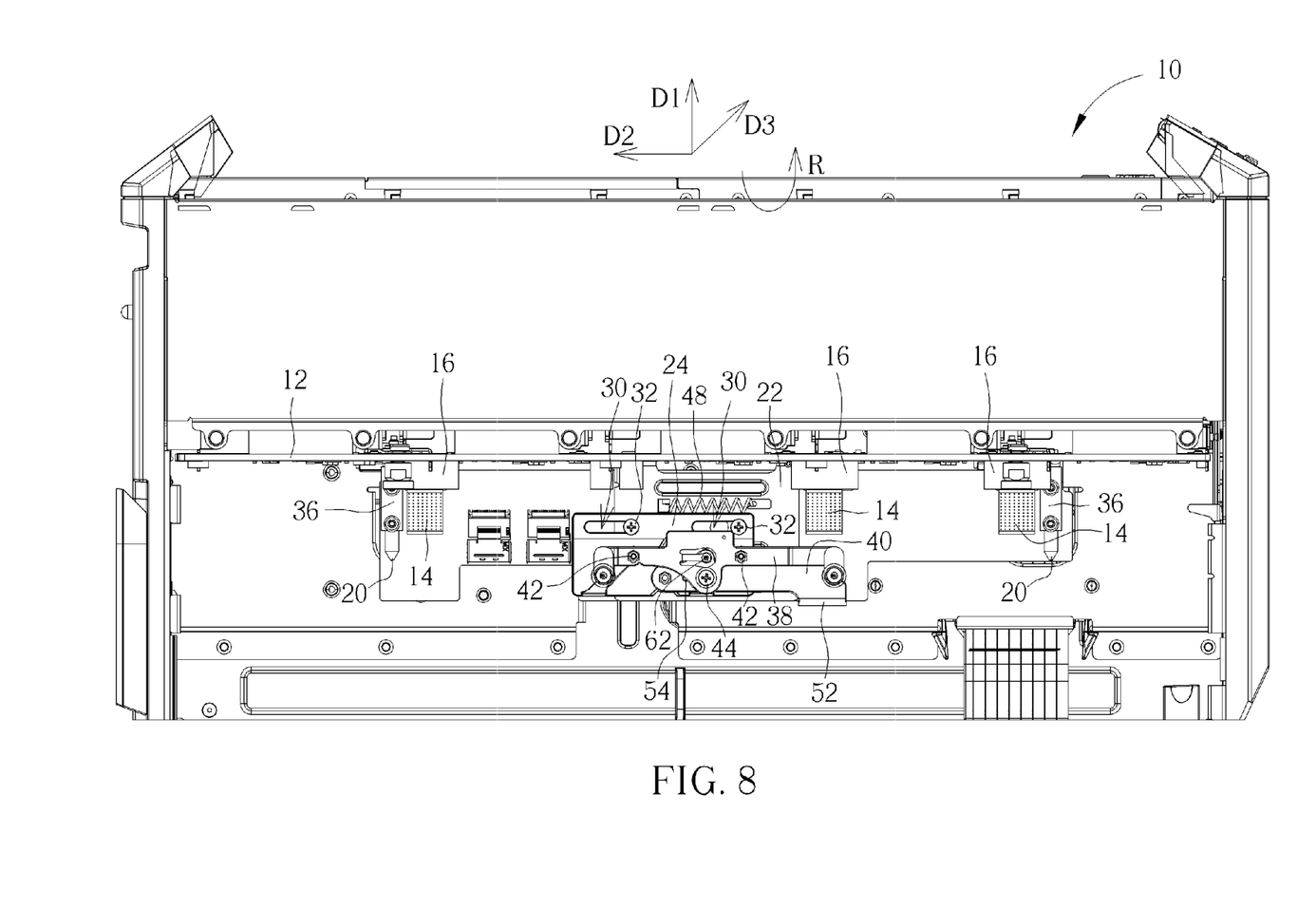

As shown in FIG. 7, the angle between the driving component 40 and the latch 38 is increased, and the actuating portion 46 and the guiding pin 42 can deeply move into the first slide slot 26 and the second slide slot 28. The driving component 40 rotates relative to the latch 38 via the pivot portion 44. During the rotation, a moving path of the actuating portion 46 can be an arc surrounding the pivot portion 44, which can be the center of the arc, and the second area 263 is connected to a rear end of the first area 261 (the linear structure) by form of the arc structure, so that the actuating portion 46 is not interfered with the first slide slot 26 structurally when sliding along the first slide slot 26. A shape of the second area 263 is designed according to the moving path of the actuating portion 46. At the time, the first connector 14 has completely combined with the second connector 16. As shown in FIG. 8, the driving component 40 can manually rotate to a position that is parallel to the latch 38, which means the angle between the body 50 and the main portion of the latch 38 is substantially equal to 0 degree, and the positioning block 62 is engaged with the second positioning hole 56. Therefore, volume of the fixing mechanism 18 can be effectively decreased when the first connector 14 and the second connector 16 are combined, and modes of the fixing mechanism 18 can be kept stably.

For disassembly of the first connector 14 and the second connector 16, the driving component 40 can rotate at the clockwise direction (opposite to the counterclockwise direction R and not shown in figures). As shown from FIG. 8 to FIG. 5, disassembly procedures are reversely operation than assembly procedures. The actuating portion 46 can slide out of the first slide slot 26 with the rotation of the driving component 40, so as to drive the movable component 24 to move relative to the bridging component 22 toward the right side. The guiding pin 42 slides out of the second slide slot 28, and the base 34 is gradually spaced from the backboard 12. The first connector 14 can be completely disassembled from the second connector 16 until the driving component 40 rotates to the position that is perpendicular to the latch 38.

In conclusion, the detachable fixing mechanism of the present invention has the guiding function and the effort-saving function. The plurality of guiding bars (the first positioning component) is disposed on the backboard, and the plurality of sleeves (the second positioning component) is disposed on the base to constrain the movement of the base relative to the backboard and to provide the guiding function. The driving component of the fixing mechanism can drive motion of the actuating portion and the first slide slot when rotating relative to the latch at the counterclockwise direction, so as to laterally move the movable component relative to the bridging component toward the right side and the left side. At the time, motion of the guiding pin and the second slide slot can vary directions of force transmission, to linearly move the base close to the backboard and to accurately insert the first connector into the second connector. For disassembly of the fixing mechanism, the driving component rotates relative to the latch at the clockwise direction. The actuating portion and the guiding pin can respectively move out of the first slide slot and the second slide slot. The movable component can be automatically recovered to the initial position by moving along the structural direction of the second slide slot, and the resilient component disposed between the movable component and the bridging component can provide the resilient recovering force for auxiliary. Further, the fixing mechanism can set the two second slide slots respectively by opposite sides of the first slide slot. One combination of the actuating portion and the first slide slot and two combinations of the guiding pin and the second slide slot can drive the base to be close to or far from the backboard, so as to effectively balance the force transmission when the plurality of connectors is connected to each other and to increase operation stability of the fixing mechanism.

Comparing to the prior art, the fixing mechanism and the related electronic device of the present invention can combine the first connector with the second connector rapidly and accurately in the effort-saving manner. The present invention has advantages of simple structure, small volume and easy operation. The plurality of fixing mechanisms can be set inside the electronic device according to user's demand for simultaneously rapid combination of the plurality of matched connectors.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A fixing mechanism for combining a first connector with a second connector, the second connector being disposed on a backboard, the fixing mechanism comprising:
   a first positioning component disposed on the backboard;
   a bridging component disposed on the backboard;
   a movable component slidably disposed on the bridging component, the movable component comprising a first slide slot and a second slide slot, a structural direction of the first slide slot being different from a moving direction of the movable component relative to the bridging component, a structural direction of the second slide slot being between the moving direction and the structural direction of the first slide slot;
   a base whereon the first connector is disposed;
   a second positioning component disposed on the base for combining with the first positioning component;
   a latch disposed on the base, the latch comprising a guiding pin slidably disposed on the second slide slot; and
   a driving component rotatably disposed on the latch, the driving component comprising an actuating portion slidably disposed on the first slide slot, the actuating portion moving inside the first slide slot to slide the movable component relative to the bridging component, so that the guiding pin slides along the second slide slot and the base moves close to the backboard, so as to combine the first connector with the second connector.

2. The fixing mechanism of claim 1, wherein the first positioning component is a bar, the second positioning component is a sleeve, and the bar is sheathed with the sleeve.

3. The fixing mechanism of claim 1, wherein the first slide slot comprises a first area and a second area, the second area is connected to the first area in a relatively bending manner.

4. The fixing mechanism of claim 3, wherein the first area is a linear structure, and the second area is an arc structure.

5. The fixing mechanism of claim 1, wherein the driving component further comprises a body and a handle, a pivot portion of the body pivots to the latch, the handle and the actuating portion are respectively disposed on two ends of the body.

6. The fixing mechanism of claim 5, wherein the driving component further comprises a first positioning hole and a second positioning hole respectively formed on the body, a distance between the first positioning hole and the pivot portion is substantially equal to a distance between the second positioning hole and the pivot hole.

7. The fixing mechanism of claim 6, wherein the latch further comprises a hole structure, a resilient arm and a positioning block, an end of the resilient arm is connected to a lateral wall of the hole structure, the positioning block is disposed on the other end of the resilient arm, the positioning block is engaged with the first positioning hole or the second positioning hole to constrain rotation of the driving component relative to the latch.

8. The fixing mechanism of claim 1, wherein the movable component further comprises a guiding slot, the bridging component further comprises a boss, and the boss is slidably disposed inside the guiding slot.

9. The fixing mechanism of claim 1, wherein the fixing mechanism further comprises:
   a resilient component, two ends of the resilient component being respectively disposed on the bridging component and the movable component.

10. An electronic device comprising:
    a backboard;
    a first connector;
    a second connector disposed on the back board and detachably combined with the first connector; and
    a fixing mechanism for combining the first connector with the second connector, the fixing mechanism comprising:
      a first positioning component disposed on the backboard;
      a bridging component disposed on the backboard;
      a movable component slidably disposed on the bridging component, the movable component comprising a first slide slot and a second slide slot, a structural direction of the first slide slot being different from a moving direction of the movable component relative to the bridging component, a structural direction of the second slide slot being between the moving direction and the structural direction of the first slide slot;
      a base whereon the first connector is disposed;
      a second positioning component disposed on the base for combining with the first positioning component;
      a latch disposed on the base, the latch comprising a guiding pin slidably disposed on the second slide slot; and
      a driving component rotatably disposed on the latch, the driving component comprising an actuating portion slidably disposed on the first slide slot, the actuating portion moving inside the first slide slot to slide the movable component relative to the bridging component, so that the guiding pin slides along the second slide slot and the base moves close to the backboard, so as to combine the first connector with the second connector.

11. The electronic device of claim 10, wherein the first positioning component is a bar, the second positioning component is a sleeve, and the bar is sheathed with the sleeve.

12. The electronic device of claim 10, wherein the first slide slot comprises a first area and a second area, the second area is connected to the first area in a relatively bending manner.

13. The electronic device of claim 12, wherein the first area is a linear structure, and the second area is an arc structure.

14. The electronic device of claim 10, wherein the driving component further comprises a body and a handle, a pivot portion of the body pivots to the latch, the handle and the actuating portion are respectively disposed on two ends of the body.

15. The electronic device of claim 14, wherein the driving component further comprises a first positioning hole and a second positioning hole respectively formed on the body, a distance between the first positioning hole and the pivot portion is substantially equal to a distance between the second positioning hole and the pivot hole.

16. The electronic device of claim 15, wherein the latch further comprises a hole structure, a resilient arm and a positioning block, an end of the resilient arm is connected to a lateral wall of the hole structure, the positioning block is disposed on the other end of the resilient arm, the positioning block is engaged with the first positioning hole or the second positioning hole to constrain rotation of the driving component relative to the latch.

17. The electronic device of claim 10, wherein the movable component further comprises a guiding slot, the bridging component further comprises a boss, and the boss is slidably disposed inside the guiding slot.

18. The electronic device of claim 10, wherein the fixing mechanism further comprises:
  a resilient component, two ends of the resilient component being respectively disposed on the bridging component and the movable component.

\* \* \* \* \*